(12) United States Patent
Komatsu et al.

(10) Patent No.: US 6,675,111 B2
(45) Date of Patent: Jan. 6, 2004

(54) METHOD AND APPARATUS FOR MEASURING FLOW VELOCITY AND METHOD AND APPARATUS FOR MEASURING FLOW RATE

(75) Inventors: Eisaku Komatsu, Gyoda (JP); Keiichi Matsushima, Gyoda (JP)

(73) Assignee: Surpass Industry Co., Ltd. (JP)

(*) Notice: Subject to any disclaimer, the term of this patent is extended or adjusted under 35 U.S.C. 154(b) by 0 days.

(21) Appl. No.: 10/081,240

(22) Filed: Feb. 25, 2002

(65) Prior Publication Data

US 2002/0143480 A1 Oct. 3, 2002

(30) Foreign Application Priority Data

Mar. 30, 2001 (JP) ........................................ 2001-098569

(51) Int. Cl.$^7$ ............................... G01F 1/00; G01F 1/66
(52) U.S. Cl. ............................. 702/45; 702/48; 702/50; 73/861.28; 73/861.27
(58) Field of Search ............................... 702/45, 33, 48, 702/50; 73/861.18, 861.19, 861.27, 861.28, 861.06

(56) References Cited

U.S. PATENT DOCUMENTS

| | | | | |
|---|---|---|---|---|
| 4,078,428 A | * | 3/1978 | Baker et al. | ............. 73/861.31 |
| 4,201,083 A | * | 5/1980 | Kurita et al. | ............. 73/861.06 |
| 5,650,571 A | * | 7/1997 | Freud et al. | ............. 73/861.06 |
| 5,818,735 A | * | 10/1998 | Tigwell et al. | ............... 702/176 |
| 6,305,233 B1 | * | 10/2001 | Braathen et al. | .......... 73/861.28 |

FOREIGN PATENT DOCUMENTS

| | | |
|---|---|---|
| JP | 10-9914 | 1/1998 |
| JP | 10-122923 | 5/1998 |
| JP | 2000-180228 | 6/2000 |

OTHER PUBLICATIONS

U.S. patent application Ser. No. 10/020,132, Matsushima et al., filed Dec. 2001.

* cited by examiner

*Primary Examiner*—John Barlow
*Assistant Examiner*—Meagan S. Walling
(74) *Attorney, Agent, or Firm*—Lorusso, Loud & Kelly

(57) ABSTRACT

Disclosed is a method and apparatus for measuring flow velocity and flow rate of a fluid in a tube member or the like with high precision. A flow vel0ocity measuring method has: a step of allowing a signal sound of ultrasound to propagate through a fluid in a tube member or the like and detecting a phase difference between the signal sound and an original signal; a step of eliminating a phase difference detected in the step to obtain synchronism; a step of detecting time or oscillation frequency required to complete the phase synchronization in the step; and a step of, on the basis of the time or oscillation frequency required to complete phase synchronization in the step, calculating flow velocity by referring to flow velocity which is preset in a table in correspondence with the time or frequency. In the table, flow velocities corresponding to changes in temperature, pressure, and kind of a fluid may be preset together with the time or oscillation frequency. A flow velocity measuring apparatus is realized by hardware having the functions of the above steps. A flow rate is obtained by multiplying the measured flow velocity with the internal diameter of a tube member.

19 Claims, 4 Drawing Sheets

METHOD AND APPARATUS FOR MEASURING FLOW VELOCITY AND METHOD AND APPARATUS FOR MEASURING FLOW RATE

BACKGROUND OF THE INVENTION

1. Field of the Invention

The present invention relates to a method and apparatus for measuring flow velocity of a fluid and a method and apparatus for measuring flow rate of a fluid by using a signal sound, mainly, ultrasound.

2. Description of the Related Art

In recent years, there is a current meter for measuring flow velocity of a fluid by using ultrasound.

The ultrasound flow velocity meter is constructed by disposing two oscillators with a spacing in the longitudinal direction in a tube member through which a fluid flows. Ultrasound is transmitted from one of the oscillators and received by the other oscillator, and ultrasound is transmitted from the other oscillator and received by the one of the oscillators. From the difference between the propagation time of the ultrasounds, the flow velocity of the fluid in the tube member is obtained. The flow rate is derived by multiplying the flow velocity with the internal diameter of the tube member.

Although the conventional ultrasound flow velocity meter uses a measuring method such as a time difference method or a phase difference method, if the spacing between the two oscillators is short, the time difference or phase difference is minute. Naturally, an error becomes big.

The propagation speed of ultrasound changes according to the temperature, pressure, and kind of a fluid. The changes may be ignored as errors, but they become a problem in the case of measuring flow velocity with high precision.

Similarly, they become a problem in the case of measuring the flow rate with high precision.

SUMMARY OF THE INVENTION

The present invention has been achieved in consideration of the circumstances as described above and its object is to provide a method and apparatus for measuring flow velocity and a method and apparatus for measuring flow rate, capable of measuring flow velocity and flow rate with high precision.

According to a first aspect of the present invention, there is provided a flow velocity measuring method for measuring flow velocity of a fluid that flows, comprising: a step of allowing a signal sound to propagate to the upstream or downstream side in a fluid and detecting a phase difference between the signal sound and an original signal; a step of eliminating a phase difference detected in the step and synchronizing the phases; a step of detecting time or oscillation frequency required to complete the phase synchronization in the step; and a step of calculating flow velocity of the fluid with reference to the flow velocity preset in correspondence with the time or oscillation frequency on the basis of the time or oscillation frequency required to complete the phase synchronization in the step.

According to the first aspect, the higher the flow velocity of a fluid is, the larger the phase difference is. When the phase difference becomes large, in proportion to the phase difference, the time required to synchronize phases becomes long and the change in oscillation frequency becomes large. When the relation between the flow velocity of a fluid and time or oscillation frequency required to synchronize phases is preset, by referring to the preset flow velocity on the basis of the detected time or oscillation frequency, the flow velocity of a fluid can be calculated. As a result, the phase difference as a minute numerical value can be accurately replaced with time or oscillation frequency required to synchronize phases as a relatively large numerical value, and the flow velocity can be measured with high precision.

According to a second aspect of the present invention, there is provided the flow velocity measuring method in the first aspect, wherein flow velocities are preset in correspondence with not only the time or oscillation frequency but also changes in temperature, pressure, and kind of a fluid.

According to the second aspect, correction can be made in correspondence with a change in temperature, pressure, and kind of a fluid. Since the phase difference changes according to the temperature, pressure, and kind of a fluid, the flow velocities are preset in association with changes in temperature and the like. Thus, even when the temperature, pressure, or kind of a fluid changes, the flow velocity can be obtained with high precision.

According to a third aspect of the present invention, there is provided the flow velocity measuring method in the first or second aspect, wherein phase difference detection performed by making signal sound propagate to the upstream side in the fluid and phase difference detection performed by making signal sound propagate to the downstream side in the fluid are alternately switched, and a calibration signal is output at the time of switching to prevent a fluctuation at the time of switching.

According to the third aspect, signals are propagated to both the upstream and downstream sides and a phase difference between the signals is detected. Flow velocities are obtained with respect to two phases deviated to the opposite directions and averaged, thereby improving the reliability of a measured value. At the time of switching the propagation direction of a signal sound, a calibration signal is output. The propagation of a signal sound may be fluctuated at the time of switching the direction of propagation of the signal sound between the upstream side and the downstream side. There is a case such that the propagating signal sound becomes extremely large or small and a measurement value largely fluctuates. To solve the problem, a calibration signal is output to prevent a fluctuation at the time of switching, that is, a large fluctuation in the measurement value. With the configuration, the flow velocity can be measured with high precision.

According to a fourth aspect of the present invention, there is provided the low velocity measuring method in the third aspect, wherein the frequency of the calibration signal output at the time of switching is modulated in correspondence with a change in temperature, pressure, and kind of the fluid.

According to the fourth aspect, the calibration signal whose frequency is modulated in correspondence with a change in temperature or the like of a fluid is output at the time of switching. Consequently, even if a change in the temperature or the like of a fluid is large, the flow velocity can be measured with high precision.

According to a fifth aspect of the present invention, there is provided a flow velocity measuring apparatus for measuring flow velocity of a fluid which flows, comprising: a plurality of signal sound transmitting/receiving units disposed in a fluid that flows, for transmitting/receiving a signal sound; a phase difference detecting unit for detecting a phase difference between a signal sound properly transmitted and received by the plurality of signal sound transmitting/ receiving units to thereby allow the signal sound to propagate to the upstream or downstream side in the fluid and the original signal; a phase synchronizing unit for eliminating a phase difference detected by the phase difference detecting unit to obtain synchronization; a detecting unit for detecting time or oscillation frequency required to complete the phase synchronization in the phase synchronizing unit; and a flow velocity calculating unit for calculating flow velocity of the fluid by referring to, on the basis of the time or oscillation frequency detected by the detecting unit, flow velocity which is preset in correspondence with the time or oscillation frequency.

According to the fifth aspect, when two signal sound transmitting/receiving units are disposed in a fluid, a signal sound is transmitted from one of the signal sound transmitting/receiving units and received by the other unit. Transmission and reception are alternately switched between the two signal sound transmitting/receiving units, and a signal sound is allowed to propagate to the upstream and downstream sides in the fluid. Further, when three signal sound transmitting/receiving units are disposed in a fluid, the signal sound transmitting/receiving unit in the center is used as a transmission side, and the signal sound transmitting/receiving units on both sides are used as a reception side. A signal sound from the signal sound transmitting/receiving unit in the center is simultaneously propagated to the upstream and downstream sides. When four signal sound transmitting/receiving units are disposed in a fluid, they are divided into two groups. A signal sound is allowed to propagate to the upstream side in one of the groups, and a signal sound is allowed to propagate to the downstream side in the other group. When five or more signal sound transmitting/receiving units are provided, the example of two units and the example of three units are combined. By the signal sound transmitting/receiving units, the signal sound is allowed to propagate to the upstream or downstream side in the fluid, the phase difference between the signal sound and the original signal is detected by the phase difference detecting unit, and the phase difference is eliminated to synchronize phases by the phase synchronizing unit. The time or oscillation frequency required to complete the phase synchronization is detected by the detecting unit. On the basis of the time or oscillation frequency, by referring to a preset flow velocity, the flow velocity of the fluid is calculated in the flow velocity calculating unit. As a result, the flow velocity can be measured with high precision.

According to a sixth aspect of the present invention, there is provided the flow velocity measuring apparatus in the fifth aspect, wherein the signal sound transmitting/receiving units are disposed in a tube member through which a fluid is passed, and measure flow velocity of the fluid in the tube member.

According to the sixth aspect, the signal sound transmitting/receiving unit allows the signal sound to propagate to the upstream or downstream side in a tube member, and the flow velocity of the fluid in the tube member can be measured from the outside.

According to a seventh aspect of the present invention, there is provided the flow velocity measuring apparatus in the fifth or sixth aspect, wherein flow velocities corresponding to changes in temperature, pressure, and kind of the fluid are preset in the flow velocity calculating unit.

According to the seventh aspect, in correspondence with a change in temperature, pressure, or kind of a fluid, the detection value can be corrected. Although the speed of a signal sound propagating through a fluid changes according to the temperature or the like of the fluid, by presetting flow velocities corresponding to changes in temperature and the like of the fluid in the flow velocity calculating unit, an error caused by a change in the temperature and the like of the fluid can be corrected. That is, although the phase difference slightly changes according to the temperature or the like of a fluid, by presetting the flow velocity corresponding to the temperature or the like in association with a flow velocity as a reference, the change in the phase difference is absorbed. As a result, even when the temperature or the like in the fluid changes, the flow velocity can be measured with high precision.

According to an eighth aspect of the present invention, there is provided the flow velocity measuring apparatus in any one of the fifth to seventh aspects, wherein three signal sound transmitting/receiving units are provided at equal intervals in the direction of flow of a fluid, the signal sound transmitting/receiving unit in the center transmits a signal sound, the signal sound transmitting/receiving units on both sides receive the signal sound, the signal sound is propagated simultaneously to the upstream and downstream sides only by the same distance in the fluid, and the phase difference is detected.

According to the eighth aspect, an average of the phase difference detected by allowing a signal sound to propagate to the upstream side and the phase difference detected by allowing a signal sound to propagate to the downstream side is calculated. Thus, the flow velocity can be measured with higher precision.

According to a ninth aspect of the present invention, there is provided the flow velocity measuring apparatus in any one of the fifth to eighth aspects further comprising: a switching unit for alternately switching phase difference detection performed by making signal sound propagate to the upstream side in the fluid and phase difference detection performed by making signal sound propagate to the downstream side in the fluid; and a calibration signal oscillating unit for oscillating a calibration signal at the time of switching performed by the switching unit to thereby prevent a fluctuation at the time of switching.

According to the ninth aspect, the signal sound propagating direction is switched by the switching unit, and phase differences in both directions are detected and averaged. At the time of switching performed by the switching unit, there is a case such that signals are lost, canceled out, or enhanced and a large fluctuation occurs. Consequently, at the time of switching, a calibration signal is oscillated by the calibration signal oscillating unit, and a process is performed with an average value only at the time of switching. Consequently, a large fluctuation in the phase difference can be prevented, and the flow velocity can be measured with higher precision.

According to a tenth aspect of the present invention, there is provided the flow velocity measuring apparatus in the ninth aspect, wherein the frequency of the calibration signal output from the calibration signal oscillating unit at the time of switching is modulated in correspondence with a change in temperature, pressure, and kind of the fluid.

According to the tenth aspect, the calibration signal whose frequency is modulated in correspondence with a change in temperature or the like of a fluid is output by the oscillating unit at the time of switching. Consequently, even when a change in temperature or the like of a fluid is large, the flow velocity can be measured with high precision.

According to an eleventh aspect of the present invention, there is provided a flow rate measuring method comprising:

a flow velocity measuring step using the flow velocity measuring method according to any one of first to fourth aspects; and a flow rate measuring step of measuring a flow rate by multiplying the flow velocity obtained in the flow velocity measuring step with an internal diameter of a tube member through which a fluid flows.

According to the eleventh aspect, on the basis of the flow velocity measured with high precision, the flow rate can be measured with high precision.

According to a twelfth aspect of the present invention, there is provided a flow rate measuring apparatus comprising: a flow velocity measuring unit using the flow velocity measuring apparatus according to any one of the fifth to tenth aspects; and a flow rate measuring unit for measuring a flow rate by multiplying flow velocity obtained by the flow velocity measuring unit with the internal diameter of a tube member through which a fluid flows.

According to the twelfth aspect, the flow rate can be measured with high precision on the basis of the flow velocity measured with high precision.

DETAILED DESCRIPTION OF THE PREFERRED EMBODIMENTS

Figure 1:
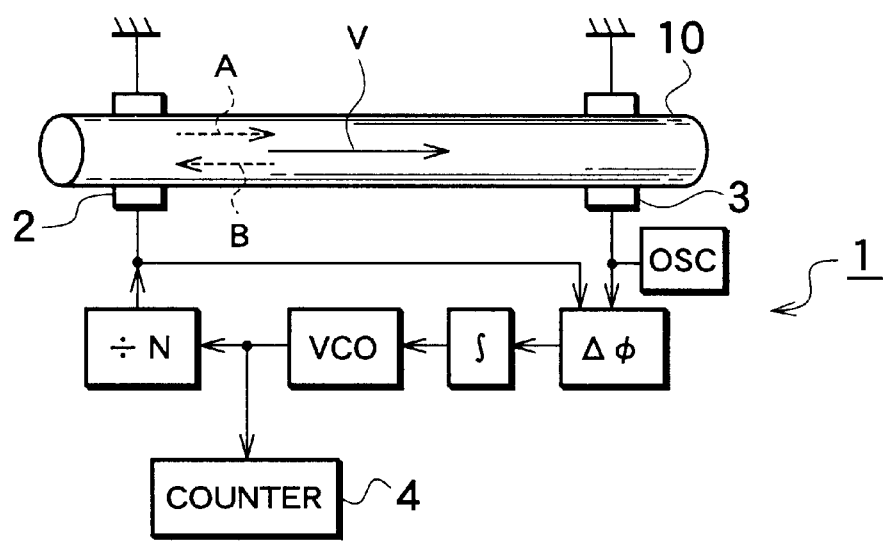
FIG. 1 is a diagram showing the configuration of a flow velocity measuring apparatus according to a first concrete example as an embodiment of the invention.

A method and apparatus for measuring flow velocity according to the invention will be described hereinbelow with reference to the attached drawings.

Flow Velocity Measuring Method

A flow velocity measuring method according to the embodiment does not use a phase difference itself, but measures the flow velocity by using time or oscillation frequency required to eliminate a phase difference and obtain synchronization.

To eliminate a detected phase difference and obtain synchronization, a phase locked loop circuit is used. However, it takes time according to the flow velocity in order to synchronize phases. During the period, a signal is transmitted from an oscillator VCO while changing its frequency. Total frequency (oscillation frequency) of an amount deviated from the reference frequency fluctuates according to the flow velocity.

The higher the flow velocity of a fluid is, the larger the phase difference is. When the phase difference is large, a change in time or oscillation frequency required to synchronize the phases also becomes large. The flow velocity of a fluid is proportional to a change in time or oscillation frequency required to eliminate the phase difference and achieve synchronization. Consequently, when time or oscillation frequency when a fluid is passed at a set speed (time or frequency required to obtain synchronization of phases) is detected and the relation between the set speed and the measured time or the measured oscillation frequency is preliminarily stored in a table, by actually measuring the time or oscillation frequency and referring to the table with the measured value, the flow velocity of the fluid can be calculated. The method and apparatus for measuring flow velocity of the embodiment is achieved by using the above.

Concretely, the flow velocity measuring method of the embodiment includes a phase difference detecting step of detecting a phase difference, a phase synchronizing step of synchronizing phases, a synchronization time detecting step of detecting time or oscillation frequency required to achieve synchronization of phases, and a flow velocity calculating step of calculating a flow velocity of a fluid.

In the phase difference detecting step, a signal sound of ultrasound is oscillated in a flowing fluid and propagated to the upstream or downstream side, and a phase difference between a signal received after propagation and an original signal (a phase difference corresponding to flow velocity of a fluid) is detected. The phase difference in the upstream and downstream sides may be detected by alternately switching phase difference detection performed by propagating the signal sound in the fluid toward the upstream side and phase difference detection performed by propagating the signal sound toward the downstream side. The flow velocities with respect to two phases deviated in the opposite directions are calculated and averaged, thereby improving the reliability of a measurement value. It is also possible to output a calibration signal at the time of switch between the upstream and downstream sides to prevent a fluctuation at the time of switch. When the calibration signal is output at the time of switching of the direction of propagating the signal sound, a large fluctuation in the measurement value can be prevented. At the time of switching the signal sound propagation direction between the upstream side and the downstream side, there is a case such that propagation of the signal sound fluctuates. There is a case such that a signal sound to propagate becomes extremely large or small, and a measurement value largely fluctuates. By outputting the calibration signal at the time of switch, a fluctuation in propagation of the signal sound can be absorbed. That is, even if a fluctuation occurs in the propagation of the signal sound at the time of switch, it is solved by the calibration signal and the large fluctuation in the measurement value can be prevented. Further, the frequency of the calibration signal may be modulated according to a change in temperature, pressure, and kind of the fluid. Since the calibration signal of which frequency is modulated according to a change in the temperature or the like of the fluid is output at the time of switch, even when the temperature or the like of the fluid largely changes, the fluid velocity can be measured with high precision.

In the phase synchronizing step, the phase difference detected in the phase difference detecting step is eliminated and synchronization is achieved by using a phase locked loop circuit (PLL circuit).

In the step of detecting synchronization time or the like, the time or oscillation frequency required until the phase synchronization is completed in the phase synchronizing step is detected by a counter.

In the flow velocity calculating step, the time or oscillation frequency required until the phase synchronization is completed in the step of detecting synchronization time or the like is referred to the flow velocity preset in correspondence with the time or oscillation frequency, thereby calculating the flow velocity of a fluid.

As a result, the phase difference as a relatively minute numerical value can be accurately replaced with the time or oscillation frequency required for the phase synchronization as a relatively large numerical value, and the flow velocity can be measured with high precision.

Flow Velocity Measuring Apparatus

A flow velocity measuring apparatus for carrying out the flow velocity measuring method will now be described.

The flow velocity measuring apparatus is, for example, an apparatus for measuring the flow velocity of a fluid which flows in a tube member. Concretely, the flow velocity measuring apparatus includes a signal sound transmitting/receiving unit, a phase difference detecting unit, a phase synchronizing unit, a unit for detecting synchronization time or the like, and a flow velocity calculating unit.

The signal sound transmitting/receiving unit has an oscillator. The oscillator is immersed in a fluid flowing in the tube member, oscillates the fluid, transmits a signal sound of ultrasound, and receives the propagated signal sound. A plurality of signal sound transmitting/receiving units are disposed in the tube member and are properly divided into a transmission side and a reception side. When two signal sound transmitting/receiving units are disposed in a fluid, a signal sound is transmitted from one of the signal sound transmitting/receiving units and received by the other unit. Transmission and reception are alternately switched between the two signal sound transmitting/receiving units, and a signal sound is allowed to propagate to the upstream and downstream sides in the fluid. Further, when three signal sound transmitting/receiving units are disposed in a fluid, the signal sound transmitting/receiving unit in the center is used as a transmission side, and the signal sound transmitting/receiving units on both sides are used as a reception side. A signal sound from the signal sound transmitting/receiving unit in the center is simultaneously propagated to the upstream and downstream sides. When four signal sound transmitting/receiving units are disposed in a fluid, they are divided into two groups. A signal sound is allowed to propagate to the upstream side in one of the groups, and a signal sound is allowed to propagate to the downstream side in the other group. When five or more signal sound transmitting/receiving units are provided, the example of two units and the example of three units are combined.

The phase difference detecting unit takes the form of a comparing circuit for comparing a signal propagated through the fluid with an original signal to detect the phase difference. By transmitting a signal sound from one of signal sound transmitting/receiving units provided in two position with a spacing in the tube member and receiving the signal sound by the other unit, the phase obtained by allowing the signal sound to propagate through the fluid to the upstream or downstream side is compared with the phase of the original signal, and a phase difference is detected.

In this case, when three signal sound transmitting/receiving units are provided at equal intervals and a phase difference of signals propagated simultaneously to the upstream and downstream sides is detected, an average value can be obtained. When the phase difference detected by allowing a signal sound to propagate to the upstream side and the phase difference detected by allowing a signal sound to propagate to the downstream side are added and the resultant is divided by two, the absolute velocity of ultrasound is obtained. In such a manner, the absolute velocity of ultrasound can be measured with higher precision.

In this case, it is also possible to provide a switching unit for properly switching signal sound transmitting/receiving units between the transmission side and the reception side. The signal sound transmitting/receiving units are provided in two or three positions in the tube member and are switched by the switching unit. That is, phase difference detection performed by making signal sound propagate to the upstream side in the fluid by transmitting a signal sound from the downstream side and receiving the signal sound by the upstream side, and phase difference detection performed by making signal sound propagate to the downstream side in the fluid by transmitting a signal sound from the upstream side and receiving the signal sound by the downstream side are alternately switched. The signal sound propagating direction is alternately switched by the switching unit, and phase differences are detected in both directions and averaged.

Further, a calibration signal oscillating unit for oscillating a calibration signal at the time of switching performed by the switching unit to thereby prevent a fluctuation at the time of switching may be provided. At the time of switching performed by the switching unit, there is a case such that signals are lost, canceled out, or enhanced and a large fluctuation occurs. Consequently, at the time of switching, a calibration signal is output by the calibration signal oscillating unit to the phase difference detecting unit, and a process is performed with an average value only at the time of switching. Thus, a large fluctuation in the phase difference can be prevented, and the flow velocity can be measured with higher precision. The frequency of the calibration signal output from the calibration signal oscillating unit at the time of switching may be modulated in correspondence with a change in temperature, pressure, and kind of the fluid. By outputting the calibration signal whose frequency is modulated in correspondence with a change in temperature or the like of a fluid by the calibration signal oscillating unit at the time of switching, even when the temperature or the like of a fluid changes largely, the flow velocity can be measured with high precision.

The phase synchronizing unit is constructed by including a phase locked loop circuit (PLL circuit). The phase difference detecting unit is constructed as a part of the phase locked loop circuit. By the phase locked loop circuit, the phase difference is detected and phases are gradually synchronized. The concrete configuration of the phase locked loop circuit will be described hereinafter.

The unit for detecting synchronization time or the like detects time or oscillation frequency required for the phase locked loop circuit in the phase synchronizing unit to complete phase synchronization.

In the case of time, time required to completely synchronize the phases since the phase locked loop circuit starts operating is used as a reference. When it is not easy to determine the time point when the phases are completely synchronized, a time point which can be easily determined such as a time point when the phase difference is reduced to the half is used as a reference.

In the case of oscillation frequency, synchronization is determined by the total of absolute values of frequencies deviated to the positive and negative sides from the reference frequency, of signals output from an oscillator VCO of the phase locked loop circuit. When the phase difference is large, the frequency output from the oscillator VCO is largely deviated from the reference frequency, so that the total of the absolute values of the frequencies of a deviated amount is also large. In this case as well, in a manner similar to the case of time, the oscillation frequency required to completely synchronize phases is used as a reference. If it is not easy to determine the synchronization, for example, the total oscillation frequency in a predetermined time since the phase locked loop circuit starts operating is calculated. That is, the total of the absolute values of frequencies deviated from the reference frequency in a predetermined time is calculated. For example, when the reference frequency is set to 0 in a graph, the frequency output from the oscillator VCO fluctuates largely at first and is gradually converged like a sine curve, the area surrounded by the curve and the zero line is calculated to obtain the total of the absolute values of frequencies. If there is other time point which can be easily determined from various factors such as the characteristic of the phase locked loop circuit, by using the time point as a reference, the time or oscillation frequency is calculated.

Based on the time or oscillation frequency detected by the unit for detecting synchronization time or the like, the flow velocity calculating unit refers to the flow velocity preliminarily recorded in a table in correspondence the time or oscillation frequency, thereby calculating the flow velocity of the fluid. In the table, the flow velocity of a fluid which flows at a set speed is recorded in association with the time or oscillation frequency required to synchronize phases. A plurality of tables may be provided in correspondence with changes in temperature, pressure, and kind of a fluid. That is, the relations between the flow velocities of a fluid and the time or oscillation frequency when the temperature or the like is changed may be preliminarily recorded in a plurality of tables. By using a table corresponding to a change in temperature, pressure, or kind of a fluid, the detection value is corrected. It is also possible to prepare only one table as a reference, and correct a fluctuation amount caused by a temperature or the like by calculation.

In the flow velocity measuring apparatus constructed as described above, first, a fluid in a tube member is oscillated by one of signal sound transmitting/receiving units, and a signal sound is received by the other signal sound transmitting/receiving unit and output to the phase difference detecting unit. The phase difference detecting unit compares the signal propagated through the fluid with the original signal to detect the phase difference. Subsequently, the phase difference is gradually eliminated to obtain synchronization by the phase synchronizing unit, and the time or oscillation frequency required to complete the phase synchronization is detected by the unit for detecting synchronization time or the like. On the basis of the time or oscillation frequency, the flow velocity calculating unit refers to a numerical value recorded in the table, thereby calculating the flow velocity.

As a result, a phase difference as a relatively minute numerical value can be accurately replaced with time or oscillation frequency as a relatively large numerical value required to achieve phase synchronization, and the flow velocity can be measured with high precision.

Flow Rate Measuring Method and Flow Rate Measuring Apparatus

A flow rate measuring method is constructed by: a flow velocity measuring step for measuring flow velocity by using the above-described flow velocity measuring method; and a flow rate measuring step of measuring a flow rate by multiplying the flow velocity obtained in the flow velocity measuring step with an internal diameter of a tube member through which a fluid flows. By the method, on the basis of the flow velocity measured with high precision, the flow rate can be measured with high precision.

A flow rate measuring apparatus is constructed by: a flow velocity measuring unit for measuring flow velocity by using the above-described flow velocity measuring apparatus; and a flow rate measuring unit provided with a calculating processing apparatus for measuring a flow rate by multiplying flow velocity obtained by the flow velocity measuring unit with the internal diameter of a tube member through which a fluid flows. By the apparatus, the flow rate can be measured with high precision on the basis of the flow velocity measured with high precision.

FIRST CONCRETE EXAMPLE

A concrete example of using the method and apparatus for measuring flow velocity for a tube member.

Figure 2:
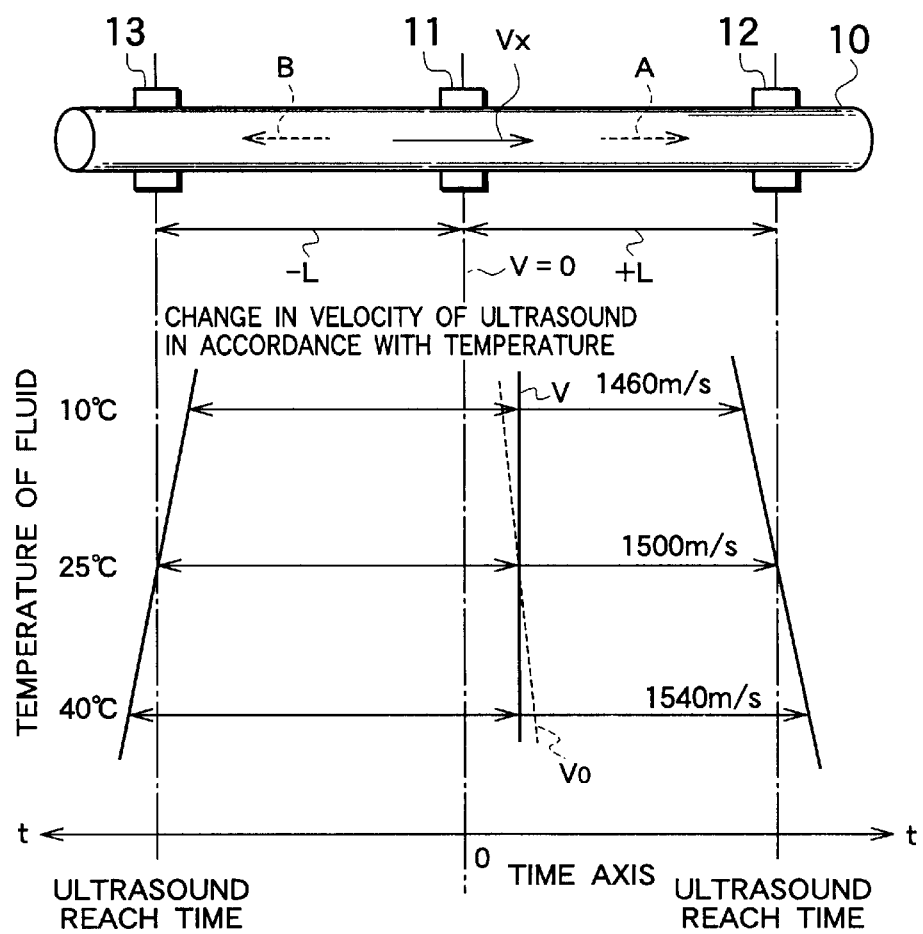
FIG. 2 is a schematic diagram for explaining a flow velocity measuring method according to the invention.

FIG. 2 is a schematic diagram for explaining the flow velocity measuring method according to the invention. Reference numeral 10 in the figure indicates a tube member in which a fluid is passed. In the tube member 10, an oscillator 11 as a signal sound transmitting/receiving unit and receiving units 12 and 13 are disposed. The oscillator 11 transmits ultrasound as a signal sound into a fluid in the tube member 10. The receiving units 12 and 13 receive the ultrasound transmitted from the oscillator 11 and propagated through the fluid. The receiving unit 12 is provided in a position apart from the oscillator 11 by a length L in to the downstream side of the tube member 10. The receiving unit 13 is provided in a position apart from the oscillator 11 by a length L to the upstream side of the tube member 10.

The flow velocity V of the fluid (for example, water) is set to 0 m/s, and ultrasound of a predetermined frequency is transmitted from the oscillator 11 and is received by the receiving units 12 and 13. Time required for the ultrasound transmitted from the oscillator 11 to reach the receiving unit 12 and time required for the ultrasound to reach the receiving unit 13 are the same irrespective of the temperature, pressure, and the like when the flow velocity V of the fluid in the tube member 10 is zero. However, the propagation velocity of the ultrasound depends on the temperature, pressure, and the like. In the case where the fluid is water, as shown in FIG. 2, the higher the temperature is, the higher the flow velocity becomes. The higher the pressure is, the higher the flow velocity becomes. Further, the flow velocity varies according to the kind of a fluid (for example, water and other fluids (including gas)).

In the case of measuring the flow velocity V of the fluid flowing in the tube member 10, when absolute velocities A and B of the ultrasound in the tube member 10 are detected and an average of the absolute velocities A and B is obtained by the following expression (1), the flow velocity V is canceled out, and the absolute velocity S of the ultrasound at the temperature and under pressure at present in the tube member is obtained. The absolute velocity A is velocity of ultrasound transmitted from the oscillator 11 toward the receiving unit 12 on the downstream side, and the absolute velocity B is velocity of ultrasound transmitted from the oscillator 11 toward the receiving unit 13 on the upstream side.

The flow velocity V of a fluid that flows in the tube member 10 is detected as follows. When the difference between the absolute velocities A and B is obtained, the absolute velocity of the ultrasound is canceled out, and a flow velocity Vo (which is a flow velocity before correction) is obtained according to the present temperature and pressure in the tube member and the kind of the fluid.

$$S=(A+B)/2 \tag{1}$$

$$Vo=(A-B)/2 \tag{2}$$

The absolute velocity S of the ultrasound calculated by expression (1) is a value depending on the temperature of the fluid or the like at that time. When the temperature and pressure are deviated from reference temperature and reference pressure, respectively, the absolute velocity S is also deviated from actual velocity. The absolute velocity S also varies according to the kind of the fluid. Similarly, the flow velocity Vo obtained by expression (2) is a value which also depends on the temperature and pressure of the fluid at that time and is deviated from an actual flow velocity. Therefore, to obtain an actual flow velocity, it is necessary to correct a deviation caused by temperature or the like. The correcting methods will now be described.

In the case where the fluid is, for example, water, the deviation of the ultrasound velocity caused by temperature is, as shown in FIG. 2, 1500 m/s at 25° C., 1460 m/s at 10° C., and 1540 m/s at 40° C. It is assumed that the pressure is constant. Therefore, when the ultrasound velocity as a reference is set to 1500 m/s, if the absolute velocity of the ultrasound in water obtained by expression (1) is 1540 m/s, 40 m/s in the flow velocity Vo obtained by expression (2) has to be corrected. That is, the proportion of 40 m/s in the absolute velocity 1540 m/s has to be corrected in the obtained flow velocity Vo.

As a concrete correcting method, a plurality of tables corresponding to changes in temperature of the fluid are provided. In a table, the flow velocity of a fluid which flows at set speed and time or oscillation frequency required to synchronize phases at that time are recorded so as to be associated with each other at each temperature. A table according to the temperature of a fluid is selected in advance and, by referring to the time or oscillation frequency required to synchronize phases to be actually measured in the table, and the flow velocity according to the temperature of the fluid is calculated. It is also possible to actually measure flow velocity of a fluid at 25° C. and time or oscillation frequency required to synchronize phases and form a table in advance, and correct a fluctuation amount due to a change in temperature by calculation. Since the change in temperature and the flow velocity are almost proportional to each other, the fluctuation amount can be easily corrected by calculation.

FIG. 1 shows an example of a flow velocity measuring apparatus 1. The flow velocity measuring apparatus 1 includes a signal sound transmitting unit 2, a signal sound receiving unit 3, a phase difference detector Δφ, an integrating circuit (low pass filter) ∫, an oscillator VCO, a frequency divider N, a counter 4, a flow velocity calculating unit (not shown), and a locked oscillator OSC.

The signal sound transmitting unit 2 is disposed in a fluid in the tube member 10 and transmits a signal sound of ultrasound. The signal sound receiving unit 3 is disposed in the fluid in the tube member 10 with a predetermined interval from the signal sound transmitting unit 2 and receives the signal sound from the signal sound transmitting unit 2.

The phase difference detector Δφ is a phase difference detecting unit for detecting the phase difference between a signal sound properly transmitted from the signal sound transmitting unit 2 and received by the signal sound receiving unit 3 to make the signal sound propagate to the upstream or downstream side in the fluid in the tube member 10 and the original signal. The phase difference detector Δφ takes the form of a comparison circuit and compares a signal input from the frequency divider N via the signal sound transmitting unit 2 and the signal sound receiving unit 3 with a signal which is input directly from the frequency divider N.

The integrating circuit (low pass filter) ∫ is connected to the phase difference detector Δφ, generates an output waveform based on the phase difference detected by the phase difference detector Δφ, and outputs the output waveform to the oscillator VCO.

The oscillator VCO is connected to the integrating circuit ∫ and oscillates at a frequency according to the output signal of the integrating circuit ∫. The oscillator VCO usually oscillates at a reference frequency and, when a phase difference occurs, oscillates at a frequency deviated from the reference frequency only by an amount corresponding to the phase difference. The output signal from the oscillator VCO is output to the frequency divider N.

The frequency divider N adjusts the frequency of an output signal from the oscillator VCO and outputs the resultant to the signal sound transmitting unit 2 and the phase difference detector Δφ.

The counter 4 is a detecting unit which is connected to the oscillator VCO, displays the frequency of the oscillator VCO, and detects the time or oscillation frequency required to complete the synchronization of phases. The counter 4 counts, as described above, either time or oscillation frequency.

The flow velocity calculating unit is constructed by a memory provided for a not-shown control circuit. The above-described tables are recorded on the memory. On the basis of the time or oscillation frequency detected by the counter 4, by referring to the data in the table, the flow velocity of the fluid is calculated. Moreover, a numerical value corrected in accordance with a change in temperature or the like of the fluid is calculated.

The locked oscillator OSC is an oscillator for oscillating a signal as a reference during startup of the flow velocity measuring apparatus 1 to make initial setting. The locked oscillator OSC is connected to the phase difference detector Δφ and outputs a reference signal.

By the phase difference detector Δφ, integrating circuit ∫, and oscillator VCO, a PLL circuit as the phase difference detecting unit and the phase synchronizing unit is constructed.

The flow velocity measuring apparatus 1 having the above configuration measures the flow velocity as follows.

First, the signal sound of the ultrasound is transmitted from the signal sound transmitting unit 2 into the fluid in the tube member 10 by the output signal from the frequency divider N. The signal sound propagates through the fluid and reaches the signal sound receiving unit 3. The signal sound receiving unit 3 receives the signal sound and outputs it to the phase difference detector Δφ. To the phase difference detector Δφ, the signal from the signal sound receiving unit 3 and also the original signal from the frequency divider N are input. The signals are compared with each other, and the phase difference is detected.

In the integrating circuit ∫, the output waveform corresponding to the phase difference is generated and output to the oscillator VCO. The oscillator VCO outputs a signal of the frequency deviated from the reference frequency only by the amount corresponding to the phase difference to the frequency divider N. When the phase difference is large, the signal of the frequency largely deviated from the reference frequency is output to the frequency divider N, the frequency is adjusted by the frequency divider N, and the operation is repeated.

In such a manner, the phase difference is corrected little by little and finally the phases are synchronized.

In the phase synchronizing process, the time or oscillation frequency required to complete the synchronization of phases is detected by the counter 4. The flow velocity calculating unit calculates flow velocity corrected in accordance with the temperature or the like of the fluid by referring to the data in the table on the basis of the time or oscillation frequency detected by the counter 4. Further, by multiplying the flow velocity with the internal diameter of the tube member 10, the flow rate can be measured.

It is also possible to attach the signal sound transmitting unit 2 and the signal sound receiving unit 3 shown in FIG. 1 in opposite positions, calculate the flow velocity of the fluid when the signal sound propagates in the direction opposite to that in the above case, and obtain an average value of the flow velocities in both directions.

SECOND CONCRETE EXAMPLE

Figure 3:
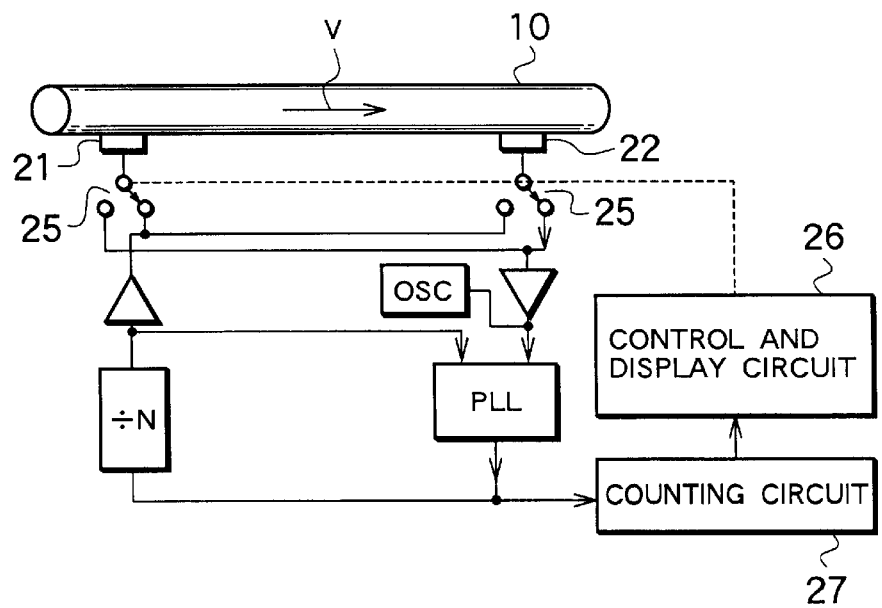
FIG. 3 is a diagram showing the configuration of a flow velocity measuring apparatus according to a second concrete example.

FIG. 3 is a diagram showing the configuration of a flow velocity measuring apparatus according to a second concrete example. Since the flow velocity measuring apparatus is similar to that of FIG. 1, the same components are designated by the same reference numerals, their description will not be repeated, and the different part will be mainly described.

The flow velocity measuring apparatus has signal sound transmitting/receiving units 21 and 22 capable of transmitting and receiving a signal sound. The signal sound transmitting/receiving units 21 and 22 are disposed at a predetermined interval in a manner similar to the signal sound transmitting unit 2 and the signal sound receiving unit 3. The PLL circuit and the frequency divider N are similar to those in the first concrete example.

Switching units 25 are provided between the signal sound transmitting/receiving units 21 and 22 and the PLL circuit and the frequency divider N. The switching units 25 connect the frequency divider N to the first signal sound transmitting/receiving unit 21 side to make a signal sound propagate in the same direction as the flow of the fluid, or connect the frequency divider N to the second signal sound transmitting/receiving unit 22 side to make a signal sound propagate in the direction opposite to the flow of the fluid. With the configuration, phase difference detection performed by making the signal sound propagate to the upstream side and phase difference detection performed by making the signal sound propagate to the downstream side are alternately switched. The signal sound propagating directions are alternately switched by the switching units 25, and the phase differences are detected and averaged.

The switching units 25 are connected to a control and display circuit 26 and properly controlled, thereby switching the propagating direction of the signal sound. The control and display circuit 26 is connected to a counting circuit 27. The counting circuit 27 has a function similar to that of the counter 4, and is connected to the PLL circuit. The control and display circuit 26 displays a measurement value in the counting circuit 27.

To the phase difference detector Δϕ of the PLL circuit, the locked oscillator OSC is connected. The locked oscillator OSC is a calibration signal oscillating unit for oscillating a calibration signal at the time of switching by the switching units 25 to prevent fluctuations at the time of switching. Since there is a case such that an input signal to the phase difference detector Δϕ is stopped, canceled out, or enhanced and a large fluctuation occurs at the time of switching performed by the switching units 25, only at the time of switching, the signals from the signal sound transmitting/receiving units 21 and 22 are interrupted and a calibration signal is output to the phase difference detector Δϕ. By performing a process with an average value only at the time off switching, a large fluctuation in the phase difference is prevented. Further, the frequency of the calibration signal output from the locked oscillator OSC may be modulated in correspondence with a change in temperature, pressure, and kind of the fluid. By outputting the calibration signal of which frequency is modulated in correspondence with a change in temperature or the like of the fluid by the calibration signal oscillating unit at the time of switching, even when the temperature or the like of the fluid largely changes, a measurement error can be solved.

With the configuration, the signal sound propagating direction is properly switched by the switches 25, and the flow velocities of the fluid in both directions are measured and averaged. At the time of switching by the switching units 25, a calibration signal is oscillated by the locked oscillator OSC to prevent signal fluctuations.

Thus, the flow velocity can be measured with higher precision. Further, by multiplying the flow velocity with the internal diameter of the tube member 10, the flow rate can be measured.

THIRD CONCRETE EXAMPLE

Figure 4:
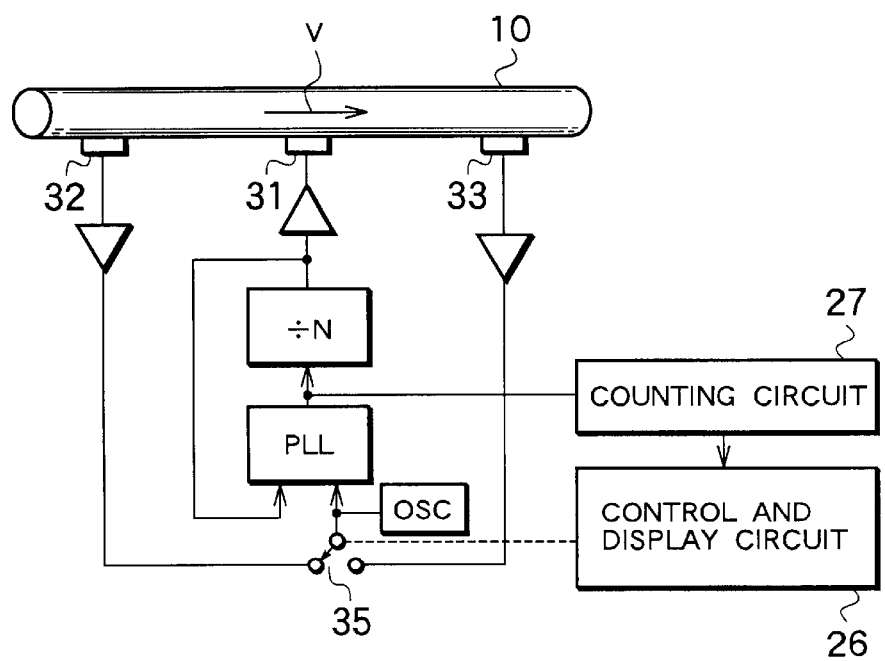
FIG. 4 is a diagram showing the configuration of a flow velocity measuring apparatus according to a third concrete example.

FIG. 4 is a diagram showing the configuration of a flow velocity measuring apparatus according to a third concrete example. The same components as those in the second concrete example are designated by the same reference numerals and a different portion will be mainly described.

The flow velocity measuring apparatus has a signal sound transmitting unit 31 and first and second signal sound receiving units 32 and 33, and a signal sound is allowed to propagate to the upstream and downstream sides from the signal sound transmitting unit 31 as a center. Each of the first and second signal sound receiving units 32 and 33 is provided in a position apart from the signal sound transmitting unit 31 as a center by a predetermined spacing. The first and second signal sound receiving units 32 and 33 are connected to the PLL circuit via a switch 35.

With the configuration, the propagation direction of the signal sound is properly switched by the switch 35, and the flow velocities of a fluid in both directions are measured and averaged. At the time of switching by the switch 35, a calibration signal is oscillated by the locked oscillator OSC to prevent a signal fluctuation which occurs at the time of switching.

Thus, in a manner similar to the second concrete example, the flow velocity can be measured with higher precision. Further, by multiplying the flow velocity with the internal diameter of the tube member 10, the flow rate can be measured.

FOURTH CONCRETE EXAMPLE

Figure 5:
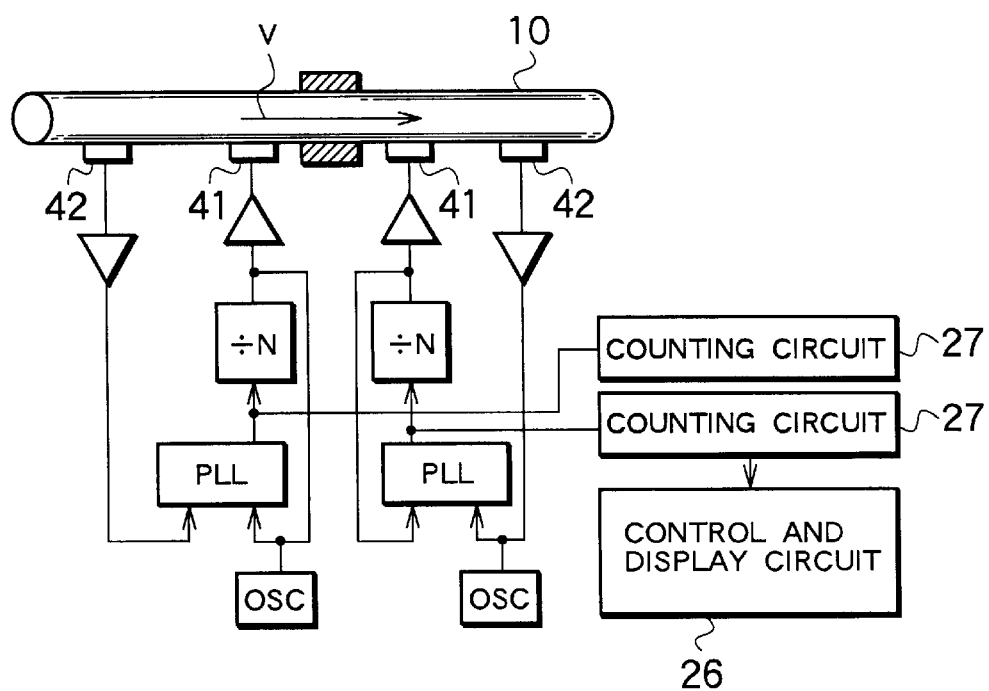
FIG. 5 is a diagram showing the configuration of a flow velocity measuring apparatus according to a fourth concrete example.

FIG. 5 is a diagram showing the configuration of a flow velocity measuring apparatus according to a fourth concrete example. The flow velocity measuring apparatus is constructed by measuring circuits of two systems. The measuring circuit of each system is constructed by a signal sound transmitting unit 41, a signal sound receiving unit 42, the PLL circuit, the frequency divider N, the locked oscillator OSC, the control and display circuit 26, and the counting circuit 27. The control and display circuit 26 is commonly used by the two systems.

With the configuration, the flow velocities of a fluid in both directions are measured by the measuring circuits of two systems and averaged.

Thus, in a manner similar to the second concrete example, the flow velocity can be measured with higher precision. Further, by multiplying the flow velocity with the internal diameter of the tube member 10, the flow rate can be measured.

Modification

Although the characteristic of the PLL circuit is fixed in the foregoing embodiments, it is desirable to use a PLL circuit in which the speed of synchronizing phases is low for the reason that the phase difference as a relatively minute numerical value can be converted to a relatively large numerical value.

Since the characteristic of the PLL circuit largely depends on the integrating circuit ∫, the characteristic of the integrating circuit ∫ may be adjusted according to the temperature or the like of the fluid. In this case, it becomes unnecessary to provide a plurality of tables corresponding to changes in the temperature of the fluid.

As described above in detail, according to the invention, the effects are produced as follows.

(1) The time or oscillation frequency required to complete the phase synchronization is detected and, on the basis of the time or oscillation frequency, a flow velocity which is preset in correspondence with the time or oscillation frequency is referred to, thereby calculating the flow velocity of the fluid. Thus, the phase difference as a relatively minute numerical value can be accurately replaced by the time or oscillation frequency required to synchronize phases as a relatively large numerical value, and the flow velocity can be measured with high precision.

(2) Since the flow velocity is preset in correspondence with not only the time or oscillation frequency but also changes in the temperature, pressure, and the kind of the fluid, even if the temperature, pressure, and kind of the fluid change, the flow velocity can be obtained with high precision.

(3) The phase difference detection performed by making signal sound propagate to the upstream side and phase difference detection performed by making signal sound propagate to the downstream side are alternately switched, and a calibration signal is output at the time of switching to prevent a fluctuation at the time of switching. Consequently, by calculating an average, the reliability of the measurement value can be improved, and a fluctuation at the time of switching is eliminated. Thus, the flow velocity can be measured with high precision.

(4) The frequency of the calibration signal output at the time of switching is modulated in correspondence with a change in temperature, pressure, and kind of a fluid. Consequently, even when a change in temperature or the like of the fluid is large, the flow velocity can be measured with high precision.

(5) As described above, since the flow velocity can be measured with high precision, by multiplying the flow velocity with the internal diameter of the tube member, the flow rate can be measured with high precision.

What is claimed is:

1. A flow velocity measuring method for measuring flow velocity of a fluid that flows, comprising:
   a step of allowing a signal sound to propagate to the upstream or downstream side in a fluid and detecting a phase difference between the signal sound and an original signal;
   a step of eliminating a phase difference detected in the step and synchronizing the phases;
   a step of detecting time or oscillation frequency required to complete the phase synchronization in the step; and
   a step of calculating flow velocity of the fluid with reference to flow velocity preset in correspondence with the time or oscillation frequency on the basis of the time or oscillation frequency required to complete the phase synchronization in the step,
   wherein flow velocities are preset in correspondence with not only said time or oscillation frequency but also changes in temperature, pressure, and kind of a fluid.

2. A flow rate measuring method comprising:
   a flow velocity measuring step using the flow velocity measuring method according to claim 1; and
   a flow rate measuring step of measuring a flow rate by multiplying the flow velocity obtained in the flow velocity measuring step with an internal diameter of a tube member through which a fluid flows.

3. A flow velocity measuring method for measuring flow velocity of a fluid that flows, comprising:
   a step of allowing a signal sound to propagate to the upstream or downstream side in a fluid and detecting a phase difference between the signal sound and an original signal;
   a step of eliminating a phase difference detected in the step and synchronizing the phases;
   a step of detecting time or oscillation frequency required to complete the phase synchronization in the step; and
   a step of calculating flow velocity of the fluid with reference to flow velocity preset in correspondence with the time or oscillation frequency on the basis of the time or oscillation frequency required to complete the phase synchronization in the step,
   wherein phase difference detection performed by making signal sound propagate to the upstream side in the fluid and phase difference detection performed by making signal sound propagate to the downstream side in the fluid are alternately switched, and a calibration signal is output at the time of switching to prevent a fluctuation at the time of switching.

4. The flow velocity measuring method according to claim 3, wherein the frequency of said calibration signal output at the time of switching is modulated in correspondence with a change in temperature, pressure, and kind of the fluid.

5. A flow rate measuring method comprising:
   a flow velocity measuring step using the flow velocity measuring method according to claim 4; and
   a flow rate measuring step of measuring a flow rate by multiplying the flow velocity obtained in the flow velocity measuring step with an internal diameter of a tube member through which a fluid flows.

6. A flow rate measuring method comprising:
   a flow velocity measuring step using the flow velocity measuring method according to claim 3; and
   a flow rate measuring step of measuring a flow rate by multiplying the flow velocity obtained in the flow velocity measuring step with an internal diameter of a tube member through which a fluid flows.

7. A flow velocity measuring apparatus for measuring flow velocity of a fluid which flows, comprising:
   a plurality of signal sound transmitting/receiving units disposed in a fluid that flows, for transmitting/receiving a signal sound;
   a phase difference detecting unit for detecting a phase difference between a signal sound properly transmitted and received by the plurality of signal sound transmitting/receiving units to thereby allow the signal sound to propagate to the upstream or downstream side in the fluid and the original signal;
   a phase synchronizing unit for eliminating a phase difference detected by the phase difference detecting unit to obtain synchronization;
   a detecting unit for detecting time or oscillation frequency required to complete the phase synchronization in the phase synchronizing unit; and a flow velocity calculating unit for calculating flow velocity of the fluid by referring to, on the basis of the time or oscillation frequency detected by the detecting unit, flow velocity which is preset in correspondence with the time or oscillation frequency.

8. The flow velocity measuring apparatus according to claim 7, wherein said signal sound transmitting/receiving units are disposed in a tube member through which a fluid is passed, and measure flow velocity of the fluid in the tube member.

9. A flow rate measuring apparatus comprising:

a flow velocity measuring unit using the flow velocity measuring apparatus according to claim 8, and a flow rate measuring unit for measuring a flow rate by multiplying flow velocity obtained by the flow velocity measuring unit with the internal diameter of a tube member through which a fluid flows.

10. The flow velocity measuring apparatus according to claim 7, wherein flow velocities corresponding to changes in temperature, pressure, and kind of said fluid are preset in said flow velocity calculating unit.

11. A flow rate measuring apparatus comprising:

a flow velocity measuring unit using the flow velocity measuring apparatus according to claim 10, and a flow rate measuring unit for measuring a flow rate by multiplying flow velocity obtained by the flow velocity measuring unit with the internal diameter of a tube member through which a fluid flows.

12. The flow velocity measuring apparatus according to claim 7, wherein three signal sound transmitting/receiving units are provided at equal intervals in the direction of flow of a fluid, the signal sound transmitting/receiving unit in the center transmits a signal sound, the signal sound transmitting/receiving units on both sides receive the signal sound, the signal sound is propagated simultaneously to the upstream and downstream sides only by the same distance in the fluid, and the phase difference is detected.

13. A flow rate measuring apparatus comprising:

a flow velocity measuring unit using the flow velocity measuring apparatus according to claim 12, and a flow rate measuring unit for measuring a flow rate by multiplying flow velocity obtained by the flow velocity measuring unit with the internal diameter of a tube member through which a fluid flows.

14. The flow velocity measuring apparatus according to claim 7, further comprising:

a switching unit for alternately switching phase difference detection performed by making signal sound propagate to the upstream side in the fluid and phase difference detection performed by making signal sound propagate to the downstream side in the fluid; and a calibration signal oscillating unit for oscillating a calibration signal at the time of switching performed by the switching unit to thereby prevent a fluctuation at the time of switching.

15. The flow velocity measuring apparatus according to claim 14, wherein the frequency of the calibration signal output from said calibration signal oscillating unit at the time of switching is modulated in correspondence with a change in temperature, pressure, and kind of the fluid.

16. A flow rate measuring apparatus comprising:

a flow velocity measuring unit using the flow velocity measuring apparatus according to claim 15; and a flow rate measuring unit for measuring a flow rate by multiplying flow velocity obtained by the flow velocity measuring unit with the internal diameter of a tube member through which a fluid flows.

17. A flow rate measuring apparatus comprising:

a flow velocity measuring unit using the flow velocity measuring apparatus according to claim 14; and a flow rate measuring unit for measuring a flow rate by multiplying flow velocity obtained by the flow velocity measuring unit with the internal diameter of a tube member through which a fluid flows.

18. A flow rate measuring apparatus comprising:

a flow velocity measuring unit using the flow velocity measuring apparatus according to claim 7, and a flow rate measuring unit for measuring a flow rate by multiplying flow velocity obtained by the flow velocity measuring unit with the internal diameter of a tube member through which a fluid flows.

19. A flow rate measuring method comprising:

a step of allowing a signal sound to propagate to the upstream or downstream side in a fluid and detecting a phase difference between the signal sound and an original signal;

a step of eliminating a phase difference detected in the step and synchronizing the phases;

a step of detecting time or oscillation frequency required to complete the phase synchronization in the step; and a step of calculating flow velocity of the fluid with reference to flow velocity preset in correspondence with the time or oscillation frequency on the basis of the time or oscillation frequency required to complete the phase synchronization in the step; and a flow rate measuring step of measuring a flow rate by multiplying the flow velocity obtained in the flow velocity measuring step with an internal diameter of a tube member through which a fluid flows.

* * * * *

UNITED STATES PATENT AND TRADEMARK OFFICE
CERTIFICATE OF CORRECTION

PATENT NO. : 6,675,111 B2
DATED : January 6, 2004
INVENTOR(S) : Komatsu et al.

It is certified that error appears in the above-identified patent and that said Letters Patent is hereby corrected as shown below:

Column 13,
Line 53, "A+" should read -- $\Delta\phi$ --.

Signed and Sealed this

Twelfth Day of October, 2004

JON W. DUDAS
*Director of the United States Patent and Trademark Office*